United States Patent
Rice et al.

[15] 3,665,035
[45] May 23, 1972

[54] ACRYLIC COMPOSITION FOR WATER TREATMENT AND PROCESS FOR MAKING SAME

[72] Inventors: Herbert L. Rice; Arthur Cizek; Marvin O. Thaemar, all of Houston, Tex.

[73] Assignee: Milchem Incorporated, Houston, Tex.

[22] Filed: Aug. 18, 1969

[21] Appl. No.: 851,085

[52] U.S. Cl. ..........................260/537 S, 252/8.55, 252/82, 252/180
[51] Int. Cl. .....................................C07c 153/00
[58] Field of Search ...............................260/537 S

[56] References Cited

UNITED STATES PATENTS 2,425,226 8/1947 Bearse ...................................260/537
3,264,273 8/1966 Greenlee ...............................260/537

FOREIGN PATENTS OR APPLICATIONS 1,180,258 6/1959 France...................................260/537

*Primary Examiner*—Lorraine A. Weinberger
*Assistant Examiner*—Vivian Garner
*Attorney*—Bertram H. Mann, Frank B. Pugsley, James G. Ulmer and Delmar L. Sroufe

[57] ABSTRACT

This invention relates to an acrylic composition; a process for obtaining the acrylic composition; to the use of such composition to remove and/or inhibit scale formation in water treatment apparatuses, oil and gas wells, producing formations, and other scale containing or attracting surfaces. Said novel composition is formed from about 80 to 90 parts by weight acrylic acid, about 7 to 15 parts by weight thioglycolic acid, and about 1.5 to 5 parts by weight ammonium persulfate.

10 Claims, No Drawings

3,665,035

ACRYLIC COMPOSITION FOR WATER TREATMENT AND PROCESS FOR MAKING SAME

BACKGROUND OF THE INVENTION

1. Field of the Invention

This invention relates to a process for making an acrylic composition for use in water treatment apparatuses, oil and gas wells, producing formations, and other scale-containing or scale-attracting surfaces by utilizing acrylic acid, ammonium persulfate, and thioglycolic acid. The composition is formed by reacting the starting materials in a one or multistage process so that the composition produced effectively prevents the crystallization of hard water ions in calcium, magnesium and barium scaling environments.

2. Description of the Prior Art

Acrylic acid has long been known to the art as a satisfactory monomer for polymerization to obtain polymer compounds used to treat scaling systems such as boilers, evaporators, and the like. However, these polymer compounds treat the systems by making sludge and scale easy to remove from the system by modifying precipitates, by producing a film on scale-attracting surfaces, or by making non-adherent scale or sludge. These polymer compounds treat the system by rendering the sludge and scale easy to remove from the system by continuous treatment which produces an undesirable film, sludge, or insoluble precipitate. Until the discovery of the present invention, no method had been known to the art to obtain acrylic compositions with performance characteristics such that the product obtained could be used either to descale water treatment apparatuses and the like as well as to inhibit scale formation on the internal linings of these vessels or other scale-attracting surfaces. Moreover, no acrylic composition has been known to the art which can be used to both descale fouled surfaces through continuous treatment and thereafter be used to inhibit scale crystallization growth. The fact that the composition of the present invention will not produce an undesirable film on treated surfaces is a particularly advantageous and novel quality over those of the compositions of the prior art.

Ammonium persulfate as a common inorganic chemical has long been known to the art for polymerization and other uses. Also, thioglycolic acid as a chain transfer agent has been used in the production of methacrylates. Yet until the discovery of the present invention, the art did not know of a method to obtain acrylic compositions as hereinafter described using acrylic acid and thioglycolic acid in conjunction with ammonium persulfate in a rapid reaction.

It is an object of this invention to provide an acrylic composition.

Other objects and advantages of this invention will be apparent from the following description, examples, and claims.

SUMMARY OF THE INVENTION

The acrylic composition produced by reacting acrylic acid, thioglycolic acid, and ammonium persulfate is complex in nature. The claimed composition is produced by a combination of the processes of polymerization, telomerization, oligomerization, isomerization, condensation, and free radical fragmentation effects. Thioglycolic acid itself acts as a chain transfer agent in polymerization. In addition, it undergoes a variety of chemical reactions as a reducing agent, especially as employed in the present invention. Its oxidized fragments are capable of reacting with acrylic acid and/or free radical fragments produced in the system by the rapid reactions that are obtained. A small amount of esterification of the thiol moiety of thioglycolic acid has been observed.

The process for obtaining the acrylic composition utilizes the simultaneous reaction of an acrylic acid in the presence of thioglycolic acid and ammonium persulfate at temperatures ranging from about 24° C to about 80° C. The reaction is exothermic and it is normally conducted in a solution. It has been found that any solvent or solvent system may be used which will dissolve the reactants without reacting in any substantial amount with the reactants or with the composition of this invention. For example, water, ethylene glycol and dimethyl formamide have been used as solvents in the production of acrylic compositions of this invention. An aqueous solvent system is presently preferred for economy and convenience.

Upon initiation of the reaction by temperature or mutation catalyst, the quantities of thioglycolic acid and ammonium persulfate employed in the process react instantly with one another and with acrylic acid, causing an exotherm to occur. The reaction occurring among the ingredients is complete within 1 to 5 minutes as measured by lack of volatile matter in determining the total solids content on a sample of product using a moisture balance or a vacuum oven at 100° C with a 25-inch vacuum. Oxygen dissolved in the aqueous reaction medium, or other solvent medium, need not be removed by purging the system by nitrogen or by other means.

The presently preferred starting material is any grade of commercially available glacial acrylic acid. Acrylic acid containing 200 parts per million of methylether of hydroquinone inhibitor may be used and it is preferred that higher concentrations of inhibitor not be used, but the amount of inhibitor in the acrylic acid is not critical to the present invention. The amount of acrylic acid to be reacted in a single reaction stage to produce the acrylic composition of the present invention may range from about 5 to about 30 percent by weight of the total solvent system (including reactants). The actual amount depends on the cooling process available for control of the reaction exotherm. If no cooling is available, it is preferable to react 5 to 10 percent of acrylic acid by weight of the total solvent system. If cooling water is available somewhat more acrylic acid may be reacted. If refrigerated cooling is available, amounts of acrylic acid from about 25 to 30 percent by weight of the solvent system may be reacted successfully. By incremental additions of any desired number of aliquot portions of the reactants whereby each successive addition made after the preceding incremental addition has completed its reaction a relatively higher proportion of reactants to solvent may be used without difficulty in controlling the temperature. The amount of solvent used for either single stage or multistage reactions is not critical, but will normally be above about 330 parts by weight for 100 parts acrylic acid used. If desired, much higher amounts of solvent may be used, but as more solvent is used the solids content of the acrylic composition (including solvent) will be reduced. Normally, a high solids liquid product is desired.

The amounts of thioglycolic acid and ammonium persulfate to be reacted are conveniently determined by the charge weight or amount of acrylic acid used. An amount of thioglycolic acid obtained as a 98 percent pure vacuum distilled material may be used in an amount ranging from about 10 to about 15 percent by weight of the acrylic acid. However, about 12 percent by weight thioglycolic acid based upon the weight of acrylic acid is presently preferred. The ammonium persulfate used in the preparation of the acrylic composition is preferably a commercially available technical grade of ammonium persulfate. About 2 to 5 percent by weight ammonium persulfate based upon the weight of acrylic acid may be used, and about 4 percent of this reactant is preferred. Preferred acrylic compositions have been prepared by utilizing all of the ammonium persulfate at the onset of the reaction. However, it has been found that incremental additions of this reactant with each charge of acrylic acid are equally effective.

The process involves an oxidation-reduction (redox) reaction which may require catalytic initiation. If the reaction process is to be conducted at room temperature, the use of from about 5 to about 30 ppm of a catalytic ion, such as ferric, ferrous, or cupric, will be required. If starting temperatures of 50° C or more are used, enough energy is present in the system to activate the reaction without recourse to the use of a catalytic ion. Ammonium persulfate will generally serve as the initiator at high temperatures. It has been found that if either ammonium persulfate or thioglycolic acid are absent, or are not present in the amounts claimed in this invention, regardless of whether an amount of catalytic ion is present at any temperatures, the acrylic composition of this invention will not be produced.

If the solids content of the above described acrylic composition is low because, for instance, natural atmospheric cooling or cooling water were employed with a low starting concentration of acrylic acid, then the solids content may be raised to an economical level by boiling the solution to remove water, or by a flash condensation or evaporation process. As previously noted, any nonreactive solvent may be used, but it is presently preferred to utilize the entire acrylic composition as an aqueous inert solvent system. A fresh charge of acrylic acid, thioglycolic acid, and ammonium persulfate is weighed into the system in the preferred amounts used to prepare the initial low solids acrylic composition, and the reaction is carried out exactly as above described. This type of staging process may be repeated again with the addition of another charge of reactants, or successive charges may be added until the acrylic composition solids level is raised as high as 35 to 40 percent of the total system.

The acrylic composition of this invention prepared by the reaction described herein is effectively utilized for scale prevention and descaling. This aqueous acidic composition is a relatively non-viscous Newtonian fluid which dissolves in surprisingly high concentrations of electrolytes. It has been found that practical (2 percent by weight) concentrations of this acrylic composition are soluble in sodium chloride and calcium chloride brine of over 20 percent activity by weight. If desired, the solvent may be evaporated to produce an amorphous, glass-like brittle solid which can be reduced to a powder. The solid is readily soluble in water. A neutralized form of the acrylic composition is presently preferred to avoid problems of handling the corrosive acid form. Solvent may also be removed from this product to obtain a dry powder.

The composition of the present invention is the reaction product of about 80 to 90 parts by weight acrylic acid; about 7 to 15 parts thioglycolic acid and about 1.5 to 5 parts ammonium persulfate. The presently preferred acrylic composition is the reaction product of about 86 parts by weight acrylic acid; 10.5 parts by weight thioglycolic acid; and 3.5 parts by weight ammonium persulfate. Preparations of the acrylic composition of this invention have been found to have a number average molecular weight in the range 500 to 1,000. Molecular weight was determined using an Hitachi Perkin-Elmer Model 115 Vapor Pressure Osmometer. A sample of acrylic composition is evaporated to dryness and dissolved in N,N-Dimethylformamide, then filtered to remove inorganic residuals. This solution is made to a known concentration. The imbalance of two thermistors is measured across a pair of thermistor beads calibrated on a series of varying concentrations of benzil (MW 210) in the same solvent at main oven setting of 55° C, and sub-oven setting of 50° C. Typically, this acrylic composition at a level of 25 to 30 percent solids by weight will have a pH of about 2 and a viscosity ranging from about 6 cp to about 12 cp. As used herein, viscosities are usually determined at 25° C or 30° C using a Fann Viscometer rotating at 300 rpm. The measurement depends on torque forces supplied to a stationary suspended cylinder within a larger concentric cylinder shearing a liquid in contact with both cylinders at a given shear rate. For the reason that a viscosity value loses significance as an indication of molecular weight in the molecular weight range of 500 to 1,000, it is deemed preferable to designate the present acrylic composition as a polyfunctional electrolyte or as a low molecular weight polyelectrolyte of complex chemical character. In fact, if the acidity of this acrylic composition is neutralized to at least 70 percent based on acrylic content and the resulting solution is diluted to 6.5 percent solids, a measurement of only 1.16 centistokes is obtained at 30° C on a Fann Viscometer. This value is not much greater than a solution of ordinary electrolyte in water would have, or of water alone.

The acrylic composition produced by the process described herein is acidic and begins to precipitate a complex low molecular weight sulfur bearing fraction due to crystallization when the acidic solution ages for several days at room temperature. To avoid this and to render the acidic acrylic composition less corrosive for practical use purposes, it is preferred that the acidity of the composition be neutralized. Convenient alkaline materials suitable for the neutralization procedure may include sodium, potassium, or ammonium hydroxide, and mono-, di-, or trialkanolamines, and the like.

PROCESS FOR PREPARATION OF OUR ACRYLIC COMPOSITION

Although other types of reactors may be utilized in the preparation of the acrylic composition, it has been found that a batch reactor obtains very satisfactory results. This reactor is a jacketed pressure vessel with individual inlets for the acrylic acid, ammonium persulfate, and thioglycolic acid reactants. The reactor contains a turbine agitator which insures complete mixing of the reactants. The initial reaction temperature is maintained by the addition of steam and cooling water to the reactor jacket. During the reaction each reactant is added in regularly prescribed sequences through individual charge lines. The preweighed acrylic acid and reaction dilution water are charged to the reactor by means of pumps and are brought to reaction temperature through the application of steam to the reactor jacket. Two charges of concentrated ammonium persulfate and one charge of thioglycolic acid are prepared for reaction and are placed in appropriate charge pots located above the reactor vessel. Each reactant is added in sequence below the solution surface by means of individual pressurized charge lines.

The initial stage of the manufacturing process entails the use of deionized dilution water, acrylic acid solution, thioglycolic acid, and ammonium persulfate. The solution water is loaded through the top of the reactor vessel and is heated to about 170° F.

After the water in the reactor is heated to about 170° F, the acrylic acid solution is added to the reactor through the manifold; and the temperature of the aqueous solution in the reactor will cool to about 158° F. After the acrylic acid load has been completed, the thioglycolic acid charge pot should have an increased pressure of between 40 psi and 50 psi, and the charge pot is opened to introduce the thioglycolic acid into the reactor. This pressure is needed to increase the pressure of low points in the thioglycolic reducing agent line in order to place all of the thioglycolic acid into the reactor. After the ammonium persulfate charge pots have obtained a pressure of between 40 to 50 psi and the reaction solution has cooled to about 158° F, the initial ammonium persulfate charge pot is opened, releasing the additive into the reactor vessel. The temperature should increase sharply to about 190° F. Generally, this increase in temperature should occur within 1 minute after the addition of the initial amount of ammonium persulfate. An additional amount of ammonium persulfate is then placed into the reactor, causing a peak temperature between about 200° F and about 210° F. This additional amount of ammonium persulfate assures complete reaction of all of the acrylic acid solution.

Although neutralization of the acrylic composition is not essential it has been found that partial and complete neutralization will lower corrosivity and yield a product not dangerous to handle. To obtain a neutralized product, a final stage, as described earlier, can be initiated which will entail the use of sodium hydroxide or the like as a neutralizing agent. This stage is begun when the acrylic solution has cooled to a temperature of about 150° F or less. The amount of neutralizing agent depends on whether the acrylic composition is to be partially neutralized, completely neutralized, or neutralized over 100 percent, based on acrylic acid stoichiometry. The neutralizing agent should be added slowly in order to prevent the formation of steam. The small amount of water lost in this step may be replaced as desired.

The composition made from the above described process has extremely unique and novel qualities unobtainable in polyacrylic acid compositions of the prior art. For example, the composition of the present invention will act as a descaler of metal surfaces containing adhering calcium sulfate and calcium carbonate scale deposits. This can be achieved in periods from about 15 to about 45 minutes, depending on the concentration of the acrylic composition utilized and the general characteristics of the scale metal surfaces. Tests have indicated that satisfactory descaling can be achieved using about 3 percent acrylic composition solution for calcium sulfate scale and about 2 percent acrylic composition solution for calcium carbonate scale. The descaled surfaces have been found to be completely void of organic and inorganic solids after treatment with the composition of the present invention. Furthermore, it has been found that concentrations of as low as 25 ppm in continuous feed systems will descale scaled surfaces over a period of 2 or 3 weeks.

Another example of the composition's unique qualities is its scale inhibition characteristic. Generally, scale inhibition can be obtained using as little as 1 ppm of the acrylic composition, depending on the severity of the scaling situation. Usually no more than 50 ppm will be required in the most severe case. It has been found that acrylic composition solutions that have been previously utilized in descaling treatment are as effective as fresh acrylic composition solutions when utilized in dilute quantities as a scale inhibitor. Versenates and ordinary calcium and magnesium ion chelating agents may be used to descale surfaces but cannot be used to inhibit scale crystallization before or after such use.

Still another example of the unique qualities of the acrylic composition of the present invention is its ability to remove calcium carbonate scale from unheated pipe and subsurface oil, gas, and water well pumps by batch, squeeze, and continuous injection methods. It will also remove scale from formation surfaces allowing increased production in oil, gas, or water wells. It will also permit lower injection pressures and provide greater efficiency in the operation of disposal wells.

The following examples will further describe the novel qualities of the composition of the present invention:

EXAMPLE I

A one stage process was utilized to make the acrylic composition of the present invention by using 537.6 grams of deionized water charged into a beaker fitted with a mechanical stirrer. The beaker was heated to about 75° C. Two hundred twenty-five grams of an aqueous 90.9 percent acrylic acid solution, calculated to produce a final acrylic acid concentration of 25.2 percent, was added. The beaker was then placed into an ice bath. Twenty-four and six tenths grams of thioglycolic acid was then added to the aqueous acrylic acid solution. When the temperature of the reactants reached 50° C, 23 grams of an aqueous 33.3 percent ammonium persulfate solution (3.75 percent ammonium persulfate based on acrylic acid) was added. An instant reaction was observed, and it was essentially complete within 5 minutes. After an increase in temperature, the beaker contents temperature was allowed to drop to about 40° C, at which point heat was applied to raise the temperature to 65° C in order to insure complete reaction of the beaker contents. The aqueous product had a Fann viscosity of 7 cp at 30° and a solids content of 29.0 percent.

A 405.1 gram sample of this composition was placed in a beaker and neutralized to a pH of 7.0 by incremental addition of 62.2 grams of sodium hydroxide This neutralized product had Fann viscosity at 30° C of 25 cps and a solids content of 34.4 percent.

EXAMPLE II

The acrylic composition of the present invention was made by first placing 537 grams of deionized water into a reaction vessel, which was stirred continuously and heated to a temperature of over 75° C. A charge of 75 grams of an aqueous solution of 90.9 percent acrylic acid was then placed into the vessel. This charge was followed by an 8.2 gram charge of thioglycolic acid. One-half minute after the addition of the thioglycolic acid, a 5.8 gram addition of an aqueous 33.3 percent ammonium persulfate solution was placed into the vessel. This addition caused an immediate exotherm, raising the reactant temperature to over 90° C. A 1.9 gram addition of an aqueous 33.3 percent ammonium persulfate solution was then placed into the vessel. The vessel contents were allowed to cool to 70° C. After sufficient cooling, the second of the three 75 gram charges of an aqueous 90 percent acrylic solution was placed into the vessel, resulting in a temperature decrease to 65° C. Another 8.2 gram thioglycolic acid charge was made which was followed one-half minute later by a charge of 5.8 grams of an aqueous 33.3 percent ammonium persulfate solution. An exothermic reaction occurred which caused an increased temperature to about 83° C. Before cooling commenced, a 1.9 gram charge of the aqueous 33.3 percent ammonium persulfate solution was added. The vessel contents were allowed to cool to a temperature of about 70° C. A final 75 gram charge of an aqueous 90.9 percent acrylic acid solution was placed into the vessel, which lowered the temperature to 65° C. A final addition of 8.2 grams of thioglycolic acid was added to the vessel contents followed 30 seconds later by 5.8 grams of an aqueous solution of 33.3 percent ammonium persulfate, resulting in an exothermic reaction and a temperature of about 80° C. A final addition of 5.8 grams of an aqueous 33.3 percent ammonium persulfate solution was placed into the vessel. This acrylic composition had a sand-bath activity solids content of 28.7 percent and a viscosity of 7 cp at 30° C as determined by a Model 39A Fann Viscometer.

EXAMPLE III

Forty grams of a glacial acrylic acid (200 ppm methyl ether of hydroquinone inhibitor) was added to 400 grams of dionized water in a beaker, and 0.2 cc of a 6 percent solution of $FeCl_3$ was added to provide about 10 ppm $Fe^{+++}$. Six grams of thioglycolic acid (Evans 98 percent vacuum distilled) was added to provide about 15 percent based on the acrylic acid charge weight. Eight grams of a 10 percent solution of ammonium persulfate was added to the beaker incrementally at room temperature to give an amount of ammonium persulfate equal to 2 percent based on the acrylic acid charge weight. A reaction exotherm of 19° C was obtained over a 5-minute period. The beaker was allowed to cool to room temperature. A fresh charge of acrylic acid in an amount of 8.8 percent of the weight of the beaker contents was then added, followed by another charge of thioglycolic acid equal to 15 percent of the weight of the incoming charge, and 2 percent of the ammonium persulfate based on the new acrylic charge was added. No more catalyst ion was needed. After cooling the beaker contents, the procedure was repeated again with 10 percent of acrylic acid based on the new beaker contents, and 15 percent thioglycolic acid and 2 percent ammonium persulfate based on the acrylic charge. The solids content of the acrylic composition was 26.5 percent by weight and the viscosity was less than 10 cp. The total charge weight was neutralized to a pH of 6.5 with 76 grams sodium hydroxide pellets. This neutralized composition then contained 30 percent total solids by weight and its viscosity was 29 cp as measured at 23° C at 300 rpm on a Fann viscometer.

What is claimed and desired to be secured by Letters Patent is:

1. A composition consisting essentially of the product formed by the reaction at a temperature of from about 24° to about 80° C in an inert solvent of 80 to 90 parts by weight acrylic acid, 7 to 15 parts by weight thioglycolic acid, and 1.5 to 5 parts by weight ammonium persulfate.

2. The composition of claim 1 in which said reaction is conducted at 24° to 50° C in the presence of a catalytic ion selected from the class consisting of ferric, ferrous, and cupric.

3. The composition of claim 1 in which said reaction is conducted in a solvent selected from the class consisting of water, dimethyl formamide, and ethylene glycol.

4. The composition of claim 3 in which said solvent is water.

5. The composition of claim 3 in which at least 280 parts solvent is used; said acrylic acid, thioglycolic acid, and ammonium persulfate are each divided into substantially equal aliquot portions; the said reaction being conducted by successive incremental additions to the solvent, each such addition consisting of one of said aliquot portions of acrylic acid followed by one of said aliquot portions of thioglycolic acid and finally by one of said aliquot portions of ammonium persulfate; and each said successive incremental addition of reactants after the initial addition is made after the reaction has been completed for the preceding incremental addition.

6. An acrylic composition formed by reacting at a temperature of from about 24° to about 80° C in an aqueous solution (1) acrylic acid of between 5 percent and 30 percent by weight of the total aqueous solution with (2) thioglycolic acid of between 10 percent and 15 percent by weight of the acrylic acid utilized and with (3) ammonium persulfate of between 3 percent and 5 percent of the acrylic acid used.

7. The composition of claim 6 in which said reaction is conducted at a temperature between 24° C and 50° C and 5 to 30 ppm of a catalytic ion selected from the class consisting of ferric, ferrous, and cupric is added to the aqueous solution.

8. The composition of claim 6 in which the acrylic acid, thioglycolic acid and ammonium persulfate are divided into substantially equal aliquot portions; the reaction is conducted by successive incremental additions to the aqueous solution, each such successive addition consisting of (a) one of said aliquot portions of acrylic acid followed by (b) one of said aliquot portions of thioglycolic acid and finally by (c) one of said aliquot portions of ammonium persulfate; and each incremental addition after the initial addition is made after the reaction is substantially completed for the preceding incremental addition.

9. Composition of claim 6 in which 12 percent thioglycolic acid and 4 percent ammonium persulfate react with said acrylic acid.

10. A composition consisting essentially of the product formed by (1) the reaction at a temperature of from about 24° to about 80° C in an inert solvent of 80 to 90 parts by weight acrylic acid, 7 to 15 parts by weight thioglycolic acid, and 1.5 to 5 parts by weight ammonium persulfate and (2) neutralization of the product obtained in (1) to a pH of about 5 to 8 with an alkaline material selected from the class consisting of (a) sodium, potassium, and ammonium hydroxides, (b) alkyl amines and (c) mono-, di-, and trialkanolamines.

* * * * *